(12) United States Patent
Nitta

(10) Patent No.: US 9,575,188 B2
(45) Date of Patent: Feb. 21, 2017

(54) PRODUCTION METHOD OF SCINTILLATOR ARRAY

(71) Applicant: HITACHI METALS, LTD., Minato-ku, Tokyo (JP)

(72) Inventor: Hideo Nitta, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 194 days.

(21) Appl. No.: 14/389,150

(22) PCT Filed: Mar. 14, 2013

(86) PCT No.: PCT/JP2013/057239
§ 371 (c)(1),
(2) Date: Sep. 29, 2014

(87) PCT Pub. No.: WO2013/146304
PCT Pub. Date: Oct. 3, 2013

(65) Prior Publication Data
US 2015/0059963 A1 Mar. 5, 2015

(30) Foreign Application Priority Data

Mar. 30, 2012 (JP) ................................. 2012-079308

(51) Int. Cl.
*G01T 1/20* (2006.01)
*B32B 37/24* (2006.01)
(Continued)

(52) U.S. Cl.
CPC ............. *G01T 1/2002* (2013.01); *B32B 37/24* (2013.01); *B32B 38/0012* (2013.01);
(Continued)

(58) Field of Classification Search
CPC .................................................. G01T 1/2002
(Continued)

(56) References Cited

U.S. PATENT DOCUMENTS 6,373,061 B1 4/2002 Deutscher
6,898,265 B1 5/2005 Mliner et al.
(Continued)

FOREIGN PATENT DOCUMENTS

JP 04-273087 A 9/1992
JP 11-166164 A 6/1999
(Continued)

OTHER PUBLICATIONS

Machine translation of Japanese Patent 2007-292584, date unknown.*
(Continued)

*Primary Examiner* — Jeff Aftergut
(74) *Attorney, Agent, or Firm* — Sughrue Mion, PLLC

(57) ABSTRACT

A method for producing a scintillator array comprising fixing a scintillator substrate to a support plate via a double-coated adhesive sheet, at least an adhesive surface thereof to be in contact with the scintillator substrate being thermally peelable; providing the scintillator substrate with lattice-patterned grooves to form pluralities of scintillator cells; filling gaps between the scintillator cells with a liquid hardening reflector resin; curing the liquid hardening reflector resin by heating to form a resin-hardened scintillator cell body; and then peeling the double-coated adhesive sheet from the resin-hardened scintillator cell body by heating.

14 Claims, 14 Drawing Sheets

(51) Int. Cl.
*B32B 38/00* (2006.01)
*B32B 38/10* (2006.01)

(52) U.S. Cl.
CPC ................ *B32B 38/10* (2013.01); *G01T 1/20* (2013.01); *B32B 2037/243* (2013.01); *B32B 2038/0016* (2013.01)

(58) Field of Classification Search
USPC ....................................................... 156/154
See application file for complete search history.

(56) References Cited

U.S. PATENT DOCUMENTS

| | | | | |
|---|---|---|---|---|
| 7,728,302 | B2* | 6/2010 | Zeitler | .................... G01T 1/202 250/370.11 |
| 2003/0178570 | A1* | 9/2003 | Tsunota | ................ G01T 1/2002 250/370.11 |
| 2005/0111613 | A1 | 5/2005 | Mliner et al. | |
| 2012/0061805 | A1* | 3/2012 | Amano | ................... H01L 21/78 257/622 |

FOREIGN PATENT DOCUMENTS

| | | | |
|---|---|---|---|
| JP | 2000-098041 | A | 4/2000 |
| JP | 2000-241554 | A | 9/2000 |
| JP | 2003-014852 | A | 1/2003 |
| JP | 2003-248059 | A | 9/2003 |
| JP | 2004-003970 | A | 1/2004 |
| JP | 2004-300231 | A * | 10/2004 |
| JP | 2005-189234 | A | 7/2005 |
| JP | 2007-292584 | A * | 11/2007 |

OTHER PUBLICATIONS

Machine translation of Japanese Patent 2004-300231, date unknown.*
Communication dated Feb. 3, 2015 from the Japanese Patent Office in counterpart application No. 2014-507666.
International Search Report of PCT/JP2013/057239 dated May 7, 2013.

* cited by examiner

Step A2

Step A3

Step A5

Step A7

Step A8

Step A12

Step A14

Step A15

Step A16

Step B3

Step B8

Step B10

Step B11

Step C6

Step C7

PRODUCTION METHOD OF SCINTILLATOR ARRAY

CROSS REFERENCE TO RELATED APPLICATIONS

This is a National Stage of International Application No. PCT/JP2013/057239 filed Mar. 14, 2013 (claiming priority based on Japanese Patent Application No. 2012-079308 filed Mar. 20, 2012), the contents of which are incorporated herein by reference in their entirety.

FIELD OF THE INVENTION

The present invention relates to a method for efficiently producing a scintillator array used in radiation detectors, etc. with high precision.

BACKGROUND OF THE INVENTION

One of radiographic inspection apparatuses is a computed tomography (CT) apparatus. The CT apparatus comprises an X-ray tube for radiating X-ray fan beams, and a radiation detector comprising a large number of radiation detection elements arranged in parallel. The X-ray tube and the radiation detector are arranged oppositely to each other with an object to be measured at center. X-ray fan beams radiated from the X-ray tube pass through the object to be measured, and are detected by the radiation detector. With every radiation having a changed angle, X-ray absorption data are collected to calculate X-ray absorbance at each position in each cross section of the object by computer analysis, thereby forming an image based on the X-ray absorbance. The radiation detector may be a detector comprising a combination of a scintillator array and silicon photodiodes, or a detector comprising a scintillator array and photomultiplier tubes.

As a method for producing such a scintillator array, JP 2000-241554 A discloses a method comprising disposing light-emitting elements on an adhesive sheet, placing a frame enclosing the light-emitting elements on the adhesive sheet, introducing an epoxy resin containing rutile-type titanium oxide powder for a light-reflecting layer into the frame to cover the light-emitting elements with the resin, curing the resin by heating, removing the adhesive sheet and the frame, and machining the cured body to form a scintillator array having a predetermined shape. However, this method suffers a large number of steps, because dissolving and washing steps are needed to peel the adhesive sheet.

JP 2004-3970 A discloses a method comprising covering a comb-shaped scintillator wafer with a polyester resin containing rutile-type titanium oxide, and then curing the resin by heating to form a light-reflecting layer. A reservoir frame is placed around the scintillator wafer to prevent the resin from flowing out. However, this method does not use an adhesive sheet for fixing the comb-shaped scintillator wafer.

JP 4-273087 A discloses a method for producing a scintillator array comprising disposing scintillator substrates with predetermined gaps on an adhesive sheet in a frame, introducing a liquid light-reflecting resin into the frame such that the liquid light-reflecting resin enters gaps between the scintillator substrates, curing the liquid resin, and removing the adhesive sheet. However, when the resin is cured on the adhesive sheet, dissolving and washing steps are needed to peel the adhesive sheet, resulting in an increased number of steps.

JP 2000-98041 A discloses a method for producing a radiation detector comprising attaching a light-emitting layer to a first ultraviolet-ray-sensitive adhesive film, forming lattice-patterned grooves reaching the adhesive film in the light-emitting layer by laser beams, attaching a second adhesive film to an opposite surface of the light-emitting layer to the first adhesive film, removing the first adhesive film by radiating ultraviolet rays, and subjecting at least one surface of the light-emitting layer to a surface treatment for improving light transmission to a photo-detector. However, this method does not use a member for supporting the second adhesive film. When the second adhesive film is curved, light-emitting layers separate from each other by the grooves are likely displaced before the resin-coating step.

JP 2003-14852 A discloses a method for producing a multi-channel radiation detector, in which pluralities of radiation detectors each constituted by a laminate of a scintillator and a light-detecting semiconductor element are arranged, comprising the steps of attaching one surface of a scintillator wafer to a holding sheet, slicing the scintillator wafer attached to the holding sheet with a predetermined interval to form gaps, pouring a white mixture containing rutile-type titanium oxide and a resin onto the sliced scintillator such that the white mixture fills the gaps and spaces around the scintillator, curing the resin to make pluralities of scintillators integral with the white mixture, machining pluralities of the integrated scintillators to a predetermined size, attaching a light-reflecting layer comprising rutile-type titanium oxide and a resin to one surface of each scintillator, and attaching a light-detecting semiconductor element to the other side of each scintillator. Used as the holding sheet is a foamed sheet. However, when the resin is cured on the foamed sheet, dissolving and washing steps are needed to peel the adhesive sheet, resulting in an increased number of steps.

OBJECT OF THE INVENTION

Accordingly, an object of the present invention is to provide a method for efficiently producing a scintillator array with high precision.

SUMMARY OF THE INVENTION

The method of the present invention for producing a scintillator array comprises the steps of fixing a scintillator substrate to a support plate via a double-coated adhesive sheet, at least an adhesive surface thereof to be in contact with the scintillator substrate being thermally peelable;

providing the scintillator substrate with lattice-patterned grooves to form a scintillator substrate having lattice-patterned grooves for defining pluralities of scintillator cells;

filling the lattice-patterned grooves with a liquid hardening reflector resin;

curing the liquid hardening resin by heating to form a resin-hardened scintillator cell body; and then peeling the double-coated adhesive sheet from the resin-hardened scintillator cell body by heating.

The method for producing a scintillator array according to the first embodiment of the present invention comprises the steps of fixing a scintillator substrate to a support plate via a double-coated adhesive sheet, at least an adhesive surface thereof to be in contact with the scintillator substrate being thermally peelable;

providing the scintillator substrate with lattice-patterned, penetrating grooves reaching the double-coated adhesive sheet to form a scintillator substrate having penetrating grooves for defining pluralities of scintillator cells;

filling the penetrating grooves with a liquid hardening reflector resin;

curing the liquid hardening resin by heating to form a resin-hardened scintillator cell body; and then peeling the double-coated adhesive sheet from the resin-hardened scintillator cell body by heating.

The method for producing a scintillator array according to the second embodiment of the present invention comprises the steps of fixing a scintillator substrate to a support plate via a double-coated adhesive sheet, at least an adhesive surface thereof to be in contact with the scintillator substrate being thermally peelable;

providing the scintillator substrate with lattice-patterned, unpenetrating grooves, to form a scintillator substrate with lattice-patterned, unpenetrating grooves, in which pluralities of scintillator cells are integral via connecting portions remaining in the scintillator substrate;

filling the unpenetrating grooves with a liquid hardening reflector resin;

curing the liquid hardening resin in the lattice-patterned grooves by heating; and then removing the connecting portions.

In the second embodiment, it is preferable to peel the scintillator substrate with lattice-patterned, unpenetrating grooves from the support plate, anneal it, and fix it again to a support plate via a double-coated adhesive sheet, at least an adhesive surface thereof to be in contact with the scintillator substrate being thermally peelable.

The method for producing a scintillator array according to the third embodiment of the present invention comprises the steps of providing the scintillator substrate with lattice-patterned, unpenetrating grooves to form a scintillator substrate with lattice-patterned, unpenetrating grooves, in which pluralities of scintillator cells are integral via connecting portions;

fixing the scintillator substrate to a support plate via a double-coated adhesive sheet, at least an adhesive surface thereof to be in contact with the scintillator substrate being thermally peelable;

removing the connecting portions to form a scintillator substrate with lattice-patterned, penetrating grooves;

filling the lattice-patterned, penetrating grooves with a liquid hardening reflector resin;

curing the liquid hardening resin by heating to form a resin-hardened scintillator cell body; and then peeling the double-coated adhesive sheet from the resin-hardened scintillator cell body by heating.

In the third embodiment, the scintillator substrate is provided with lattice-patterned, unpenetrating grooves, and then annealed.

In the third embodiment, it is preferable that a jig having as large an opening as permitting the scintillator substrate with lattice-patterned, unpenetrating grooves to be fixed to the support plate in a planar direction is attached to a peripheral portion of an upper surface of the support plate; that the scintillator substrate with lattice-patterned, unpenetrating grooves is adhered to the double-coated adhesive sheet exposed in the opening of the jig; and that the connecting portions are then removed from the scintillator substrate with lattice-patterned, unpenetrating grooves by grinding.

It is preferable that thermally peelable adhesive surfaces of adhesive sheets are attached to the entire side surfaces of the support plate, to which the scintillator substrate is fixed, such that the adhesive sheets project upward from the support plate, and that the liquid hardening resin is introduced into a frame constituted by upper extensions of the adhesive sheets, so that gaps between the scintillator cells are filled with the liquid hardening resin. Also, a frame constituted by adhesive sheets may be attached to the double-coated adhesive sheet adhered to the support plate, such that the frame surrounds the scintillator substrate, the liquid hardening resin being introduced into the frame. Adhesive surfaces of the adhesive sheets constituting the frame, which are brought into contact with the liquid hardening resin, are preferably thermally peelable.

In any method in the above embodiments, it is preferable that both surfaces of the resin-hardened scintillator cell body are ground to from a scintillator cell array on which the scintillator cells are exposed, that the scintillator cell array is fixed to a support plate via a double-coated adhesive sheet, at least an adhesive surface thereof to be in contact with the scintillator cell array being thermally peelable, that the scintillator cell array is covered with a liquid hardening reflector resin, that the liquid hardening resin is cured by heating to form a resin-hardened scintillator cell array, and that a surface of the resin-hardened scintillator cell array is ground such that the scintillator cells are exposed.

The surface roughness Ra of the support plate is preferably 10 μm or less, more preferably 0.01-10 μm, most preferably 0.1-2 μm.

The height unevenness of the support plate is preferably 100 μm or less, more preferably 0.01-100 μm, most preferably 0.1-20 μm.

The aspect ratio of the scintillator cells is preferably 5 or less, more preferably 0.2-5.

DESCRIPTION OF THE PREFERRED EMBODIMENTS

The embodiments of the present invention will be explained in detail below referring to the attached drawings, without intention of restricting the present invention thereto. Explanations of each embodiment are applicable to other embodiments, unless otherwise mentioned.

Scintillators used in the present invention may be made of, for example, gadolinium oxysulfide (GOS) or gadolinium-aluminum-gallium garnet (GGAG). GOS may have, for example, a composition of $Gd_2O_2S$ activated by at least one selected from Pr, Ce and Tb. GGAG may have, for example, a main composition of $(Gd_{1-x}Lu_x)_{3+a}(Ga_u Al_{1-u})_{5-a}O_{12}$, wherein x is 0-0.5, u is 0.2-0.6, and a is −0.05 to 0.15, which is activated by at least one selected from Ce, Pr, etc. It should be noted, however, that the present invention is not restricted to a particular scintillator composition.

[1] Method for Producing Scintillator Array (1) First Embodiment

Figure 1:
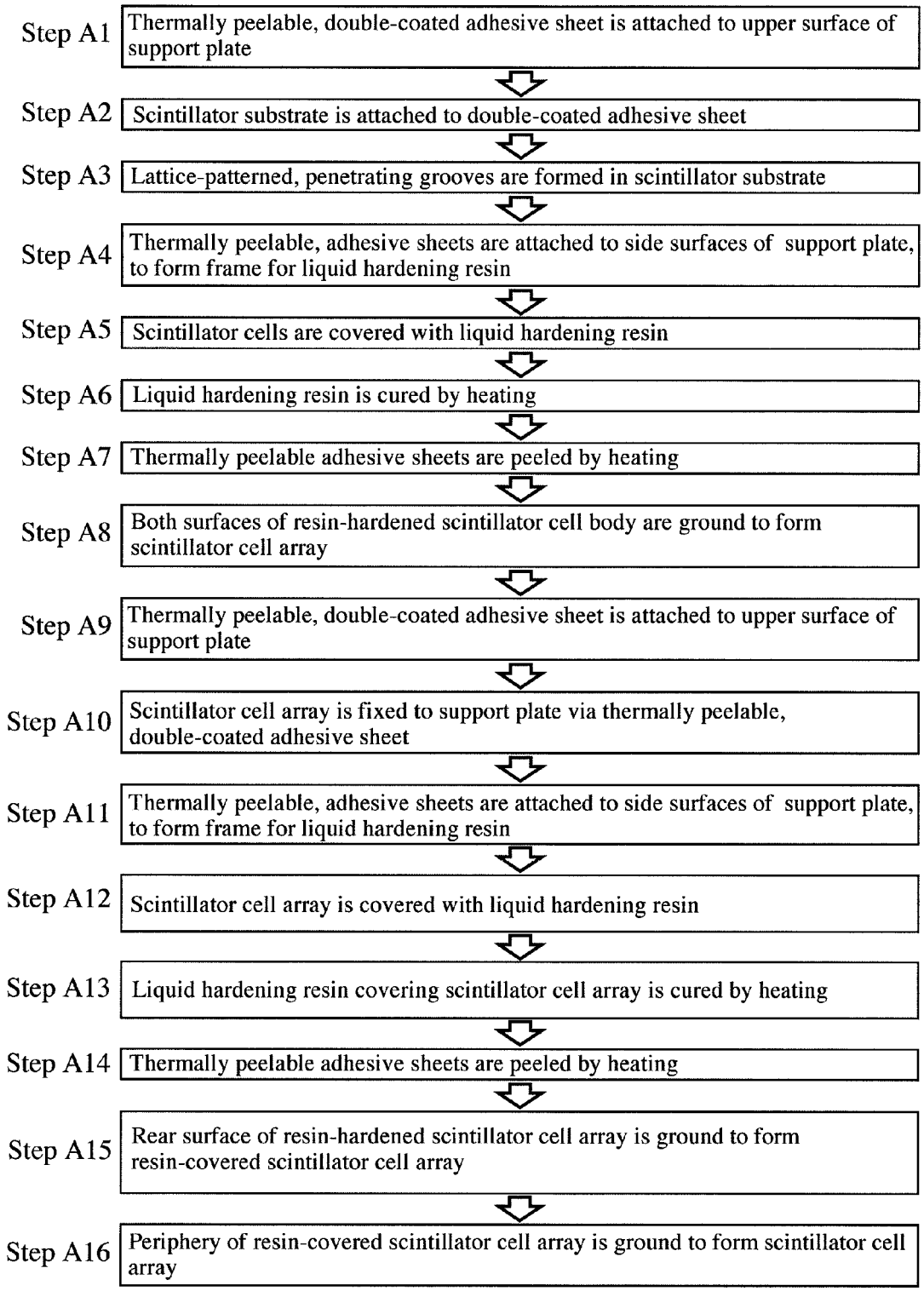
FIG. 1 is a flowchart showing a method for producing a scintillator array according to the first embodiment of the present invention.

FIG. 1 is a flowchart showing the production method of the first embodiment. First prepared is a thermally peelable, double-coated adhesive sheet constituted by a base film having first and second adhesive surfaces on both sides, at least the second adhesive surface being a thermally peelable adhesive layer, and each adhesive layer being covered with a separator. When the thermally peelable adhesive layer is heated to a predetermined temperature, it is foamed to have decreased adhesion, so that it becomes easily peelable. The first adhesive layer is also preferably a thermally peelable adhesive layer foamable at the same temperature as that of the second adhesive surface.

Figure 2:
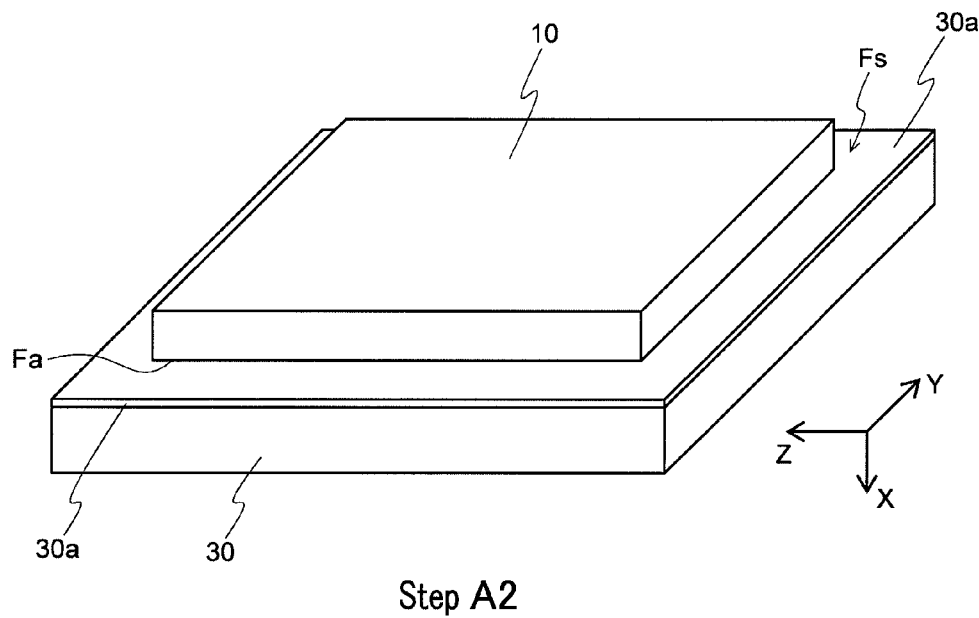
FIG. 2 is a perspective view showing a scintillator substrate fixed to a support plate via a double-coated adhesive sheet.

As shown in FIG. 2, a separator is peeled from the first adhesive surface of the thermally peelable, double-coated adhesive sheet 30a as wide as covering an upper surface of the support plate 30, and the exposed first adhesive surface is attached to the upper surface of the support plate 30 (step A1). With a separator peeled from the second adhesive surface of the thermally peelable, double-coated adhesive sheet 30a, a bottom surface Fa of a rectangular, planar scintillator substrate 10 is attached to the second adhesive surface Fs (step A2). Thus, the scintillator substrate 10 is fixed to the support plate 30 via the thermally peelable, double-coated adhesive sheet 30a.

An upper surface of the support plate 30, to which the adhesive sheet 30a is attached, preferably has arithmetic average roughness Ra (JIS B0601-1994) of 10 μm or less. When Ra is more than 10 μm, the distances between the scintillator cells and the support plate 30 largely vary, the grinding of the scintillator cells should be increased to have uniform thickness t. The lower limit of Ra may be about 0.01 μm. Accordingly, the surface roughness Ra of the support plate 30 is preferably 10 μm or less, more preferably 0.01-10 μm, most preferably 0.1-2 μm. Such a flat support plate 30 is preferably a glass plate.

To provide the scintillator cells with uniform thickness t, the support plate 30 preferably has as small height unevenness as possible. When a support plate 30 is placed on a flat plate as a reference surface to measure the height $H_1$, $H_2$, $H_3$, $H_4$, $H_5$ of the upper surface of the support plate 30 from the reference surface at five arbitrary points by a dial gauge, thereby determining average height Hav, the height unevenness is defined as the maximum difference ΔHmax among differences $ΔH_1$, $ΔH_2$, $ΔH_3$, $ΔH_4$, $ΔH_5$ between the measured heights $H_1$, $H_2$, $H_3$, $H_4$, $H_5$ and the average height Hav. In place of the dial gauge, a three-dimensional meter using laser beams may be used for measurement.

The height unevenness of the support plate 30 is preferably 100 μm or less. With the height unevenness of more than 100 μm, the distances between the scintillator cells and the support plate 30 vary largely, needing much grinding to secure the uniformity of the thickness t of the scintillator cell. Practically, the height unevenness of the support plate 30 is more preferably 0.01-100 μm, most preferably 0.1-20 μm.

Figure 3:
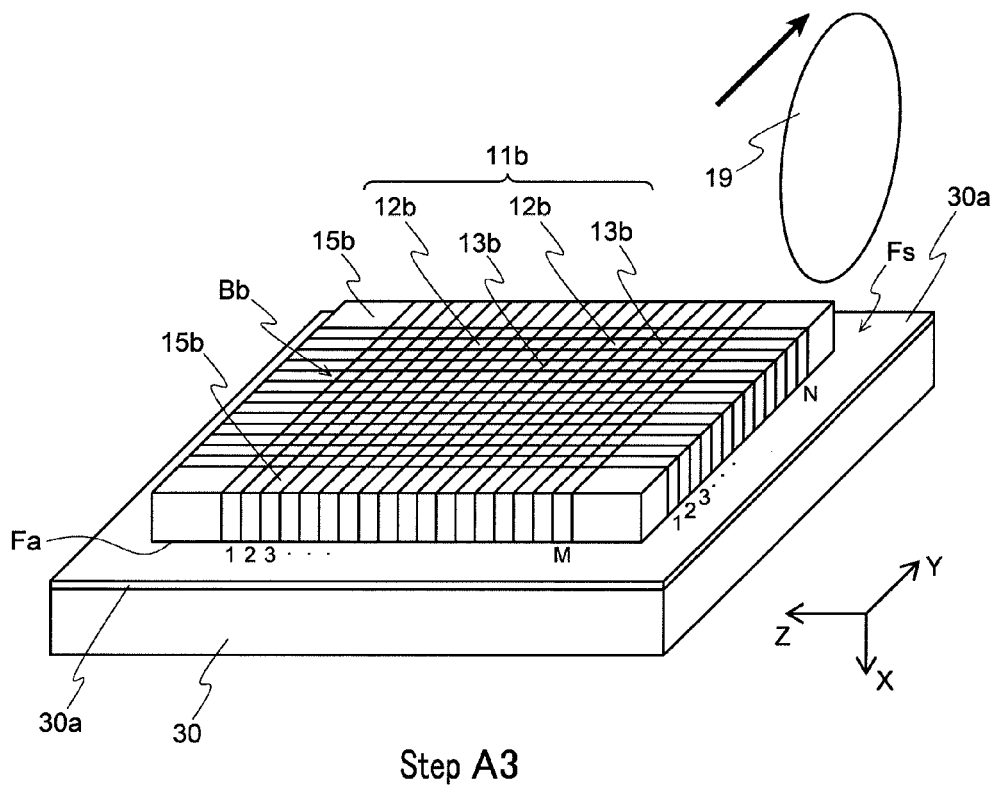
FIG. 3 is a perspective view showing the formation of lattice-patterned, penetrating grooves in the scintillator substrate of FIG. 2.

As shown in FIG. 3, using a rotating cutting grinder (for example, diamond grinder) 19, pluralities of parallel grooves 13b as deep as reaching the adhesive sheet 30a are formed in a perpendicular lattice pattern in the scintillator substrate 10 (step A3). The scintillator substrate is divided by the grooves 13b to scintillator cells 12b in the number of M×N, wherein M and N are natural numbers of 2 or more, excluding end portions 15b. Because the scintillator substrate 11b with penetrating grooves is fixed to the support plate 30 via the thermally peelable, double-coated adhesive sheet 30a, the scintillator cells 12b are not displaced. Both end portions 15b, 15b of the scintillator substrate 11b with penetrating grooves are cut off in a subsequent step. In FIG. 3, the X-axis indicates the thickness direction of the scintillator substrate 10, and the Y- and Z-axes respectively indicate the directions of the grooves 13b.

In each scintillator cell 12b, a shorter one of a Y-direction size and a Z-direction size is called width w, and an X-direction size is called height t. The aspect ratio (expressed by w/t) of each scintillator cell 12b is preferably 5 or less from the aspect of the resolution of CT apparatuses. Because the aspect ratio of less than 0.2 makes it difficult to hold the scintillator cells 12b by the adhesive sheet 30a, the aspect ratio w/t is more preferably 0.2-5.

Figure 5A:
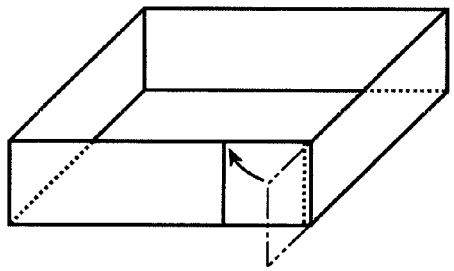
FIG. 5(a) is a perspective view showing one example of frames formed by an adhesive sheet.
Figure 5B:
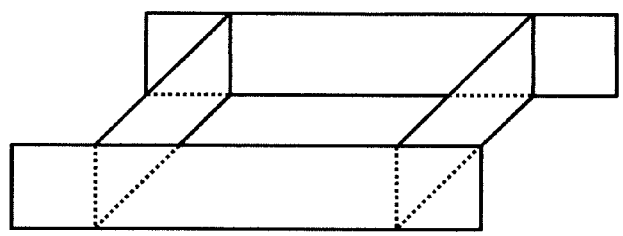
FIG. 5(b) is a perspective view showing another example of frames formed by adhesive sheets.

Thermally peelable adhesive surfaces of four thermally peelable, double-coated adhesive sheets 31F, 31R, 31B, 31L are attached to the entire side surfaces of the support plate 30, such that the double-coated adhesive sheets 31F, 31R, 31B, 31L partially project upward from the support plate 30. Upper extensions of the double-coated adhesive sheets 31F, 31R, 31B, 31L constitute a rectangular frame for providing a reservoir space for storing a liquid hardening resin for forming resin layers acting as reflectors (step A4). Incidentally, the adhesive sheets 31F, 31R, 31B and 31L may be thermally peelable, single-coated adhesive sheets. Instead of using four thermally peelable, double-coated adhesive sheets, an adhesive ribbon may be wound around the side surfaces of the support plate with end portions of the ribbon overlapped, to form a rectangular frame as shown in FIG. 5(a). As shown in FIG. 5(b), four adhesive sheets may be attached to the side surfaces of the support plate successively, with end portions of adjacent adhesive sheets bonded. In the cases of FIGS. 5(a) and 5(b), thermally peelable, single-coated adhesive sheets may be used in place of the thermally peelable, double-coated adhesive sheets. In any case, the leakage of the resin can be surely prevented by a frame formed by the thermally peelable, double- or single-coated adhesive sheets.

Also, instead of attaching the double-coated adhesive sheets to the entire side surfaces of the support plate 30, an adhesive sheet frame surrounding the scintillator substrate 11b with penetrating grooves may be attached to the double-coated adhesive sheets 31F, 31R, 31B, 31L attached to the support plate 30. This frame can also surely prevent the leakage of the resin.

Figure 4:
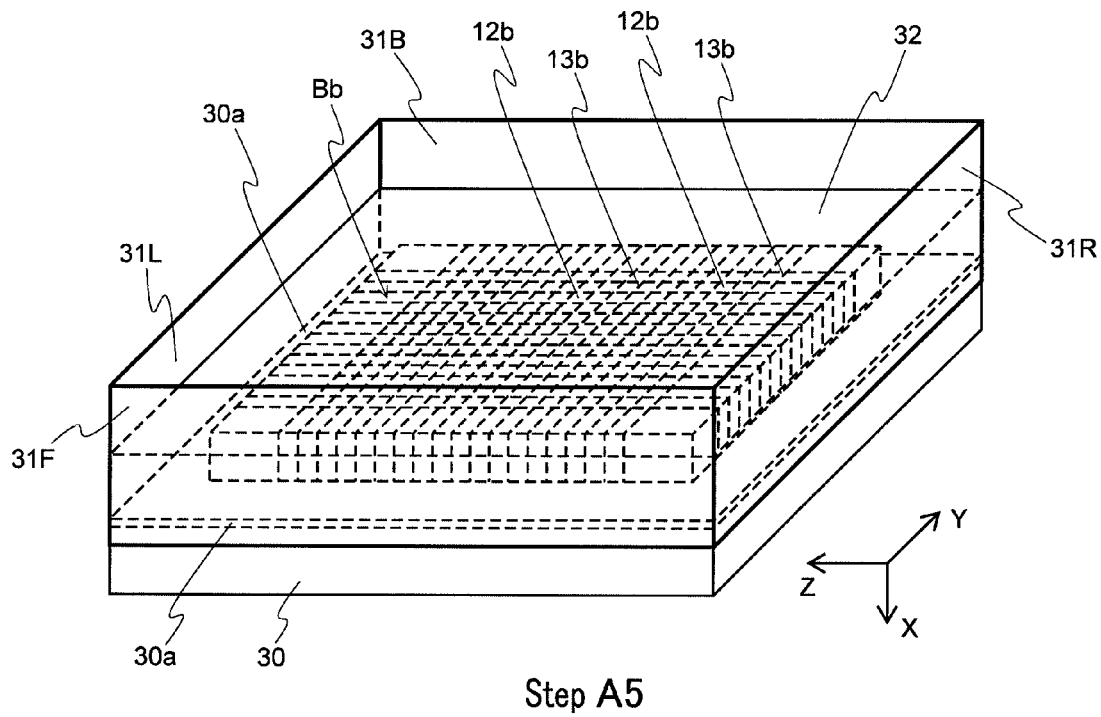
FIG. 4 is a perspective view showing the filling and hardening of a resin in the step A5.

When a liquid hardening reflector resin 32 is introduced into the rectangular frame as shown in FIG. 4, the grooves 13b are filled with the liquid hardening resin 32, and the scintillator cells 12b are covered with the liquid hardening resin 32 (step A5). As the liquid hardening resin 32 acting as reflectors after cured, for example, an epoxy resin containing white titanium oxide particles may be used. The amount of the liquid hardening resin 32 introduced into the frame is preferably set such that its thickness after curing can be adjusted in a subsequent step.

The liquid hardening resin 32 introduced into the frame is cured by heating to a first temperature (step A6). When the liquid hardening resin 32 is cured, M×N scintillator cells are made integral with the hardened resin 32'. The first heating temperature is preferably 50-150° C. The heating time of the liquid hardening resin 32 may be 1-6 hours, preferably 1-3 hours.

Figure 6:
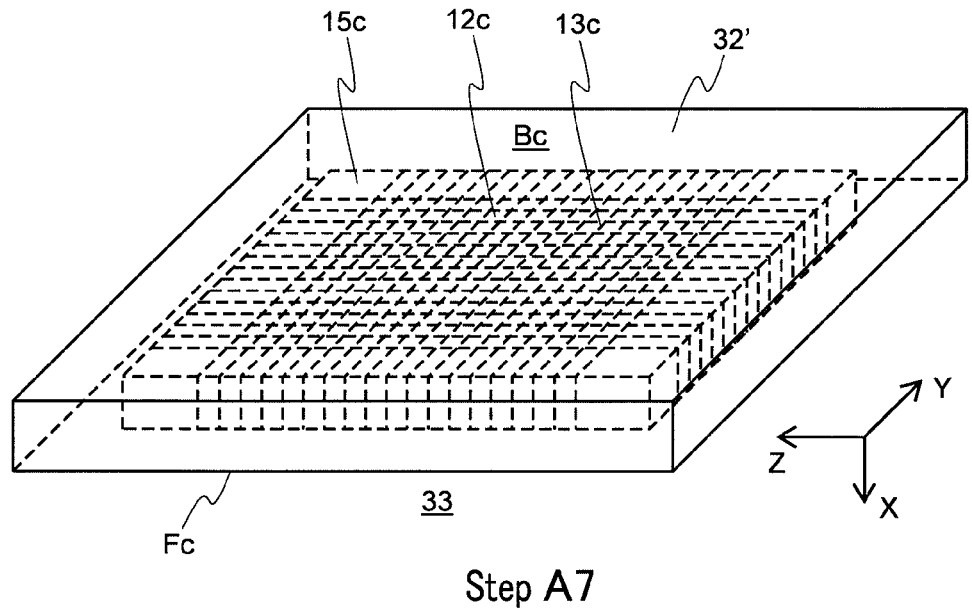
FIG. 6 is a perspective view showing a resin-hardened scintillator cell body obtained by the step A7.

After curing the liquid hardening resin 32, heating is conducted to a second temperature equal to or higher than the foaming start temperature of the thermally peelable, double-coated adhesive sheet 30a and the thermally peelable adhesive layers of the thermally peelable, double-coated adhesive sheets 31F, 31R, 31B, 31L. Because the thermally peelable adhesive layer foamed by heating to the second temperature has decreased adhesion, the thermally peelable, double-coated adhesive sheets can be easily peeled. Thus, a resin-hardened scintillator cell body 33 shown in FIG. 6 is obtained (step A7). The reference numerals of members in the resin-hardened scintillator cell body 33 corresponding to those constituting the scintillator substrate 11b with penetrating grooves have "c" in place of "b" after the same numbers.

The second heating temperature is preferably equal to or higher than the first heating temperature, and may be, for example, 80-180° C. Because the thermally peelable adhesive sheets leave only small amounts of adhesive layers after thermal peeling, they are easily removed by washing, make it unnecessary to remove all the thermally peelable adhesive sheets by a solvent. Heating at the first and second temperatures can be conducted in the same heating apparatus. In this case, after the resin is cured at the first temperature, the temperature is elevated to the second temperature to peel the thermally peelable adhesive sheets.

In the resin-hardened scintillator cell body 33 thus obtained, the scintillator cells 12b are aligned with high precision. Because the thermally peelable adhesive sheet is used to fix the scintillator substrate to the support plate, it is easily peeled only by heating, enabling the efficient production of the scintillator array.

Figure 7:
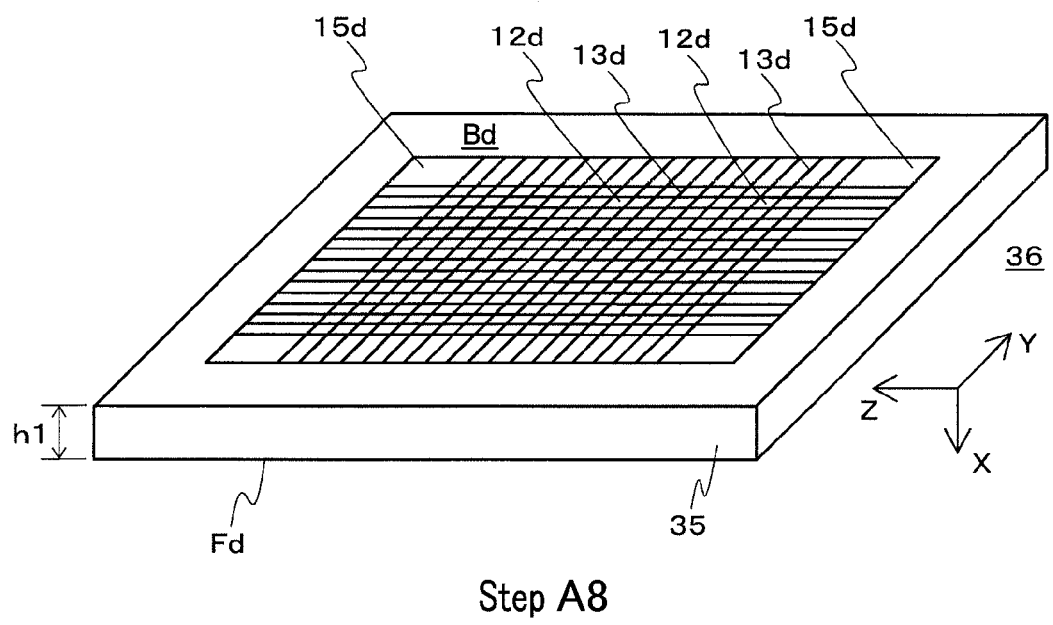
FIG. 7 is a perspective view showing a cell array obtained by the step A8.

The rear surface Bc and front surface Fc of the resin-hardened scintillator cell body 33 are ground or polished to expose the scintillator cells 12b, thereby forming a scintillator cell array 36 having a uniform thickness h1, on which scintillator cells 12d, resin layers 13d and end portions 15d are exposed, as shown in FIG. 7 (step A8). The reference numerals of members in the scintillator cell array 36 corresponding to those of members constituting the resin-hardened scintillator cell body 33 have "d" in place of "c" after the same numbers. In the scintillator cell array 36, the scintillator cells 12d, the resin layers 13d and the end portions 15d are surrounded by a peripheral resin layer 35.

With a separator peeled from the first adhesive surface of the thermally peelable, double-coated adhesive sheet 60a, which is the same as the adhesive sheet 30a, the first adhesive surface is attached to an upper surface of the support plate 60 (step A9). With a separator peeled from the second adhesive surface of the adhesive sheet 60a, the scintillator cell array 36 is attached to the exposed second adhesive surface (step A10). As a result, the scintillator cell array 36 is fixed to the support plate 60.

Figure 8:
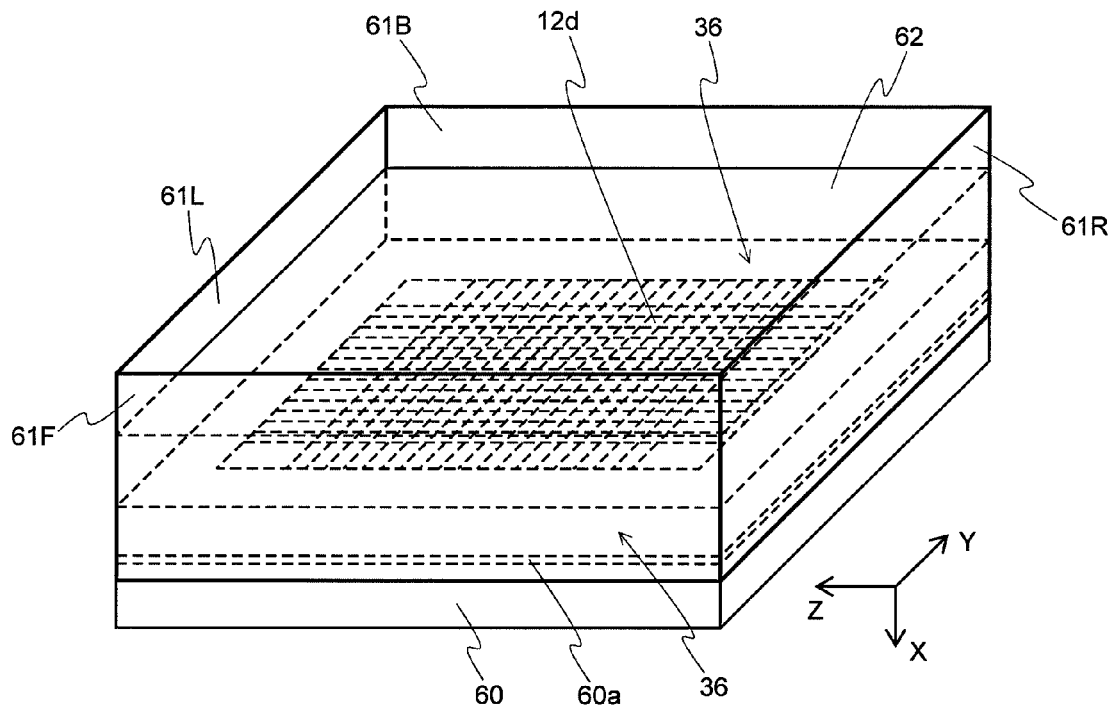
FIG. 8 is a perspective view showing the filling and hardening of a resin in the step A12.

As shown in FIG. 8, the same four thermally peelable, double-coated adhesive sheets 61F, 61R, 61B, 61L as used in the step A4 are attached to the side surfaces of the support plate 60 to form a frame for storing a liquid hardening reflector resin (step A11). Four adhesive sheets 61F, 61R, 61B, 61L are adhered in their end portions to form a rectangular frame. The same liquid hardening reflector resin 62 as in the step A5 is introduced into this rectangular frame, to cover the rear surface of the scintillator cell array 36 (step A12).

Figure 9:
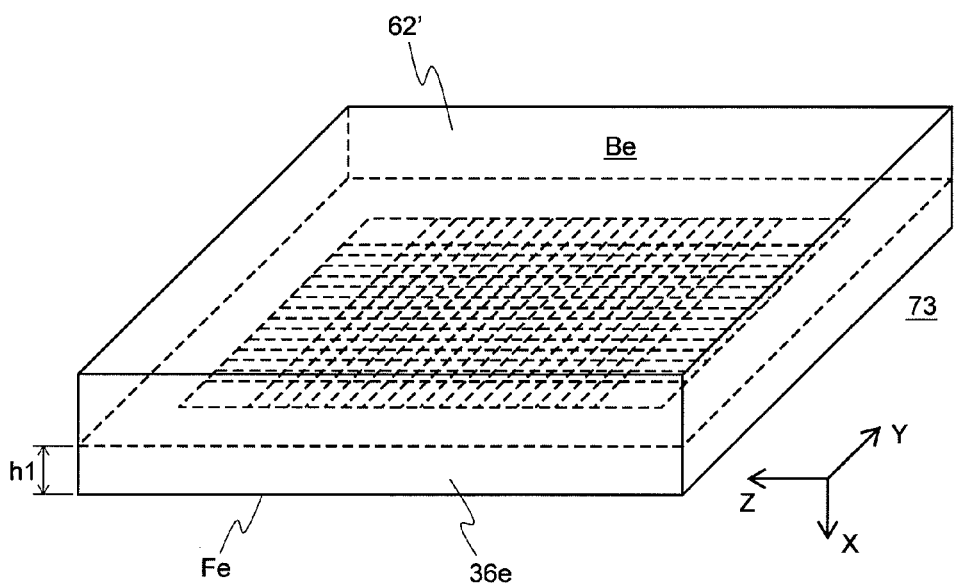
FIG. 9 is a perspective view showing a resin-hardened cell array obtained by the step A14.

The liquid hardening resin 62 introduced into the frame is cured by heating to the above first temperature, so that the rear surface of the scintillator cell array 36 is covered with a hardened resin 62' (step A13). After the liquid hardening resin 62 is cured, heating is conducted to the second temperature, so that the thermally peelable, double-coated adhesive sheets 61F, 61R, 61B, 61L, and the thermally peelable, double-coated adhesive sheet 60a can be easily peeled due to decreased adhesion. A resin-hardened scintillator cell body 73 shown in FIG. 9 is thus obtained (step A14). After peeling the adhesive sheets, the resin-hardened scintillator cell body 73 is washed, if necessary. The reference numerals of members in the resin-hardened scintillator cell body 73 corresponding to those of members constituting the scintillator cell array 36 have "e" in place of "d" after the same numbers.

Figure 10:
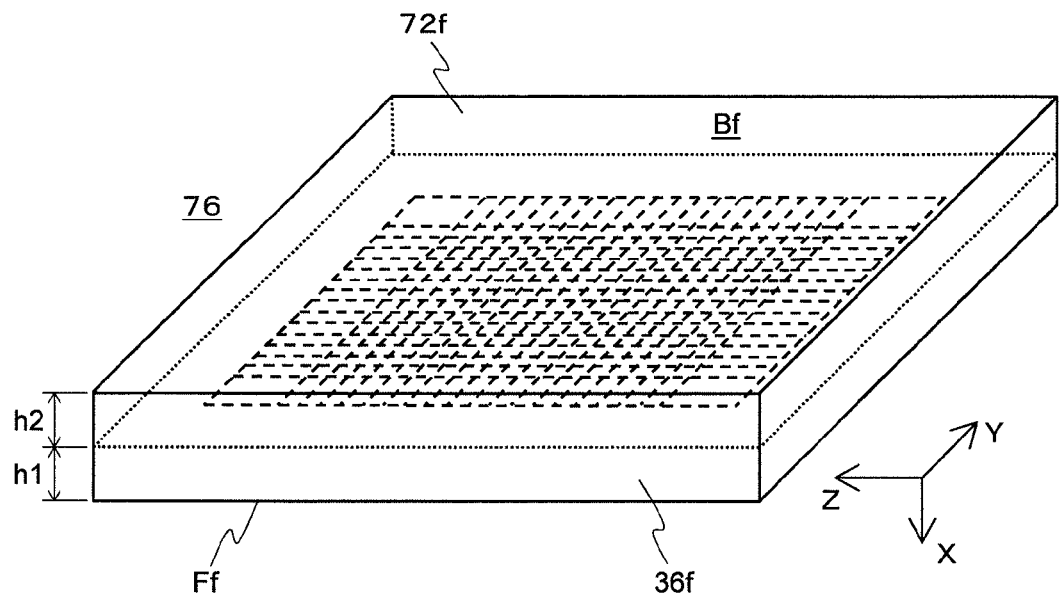
FIG. 10 is a perspective view showing a resin-covered cell array obtained by the step A15.
Figure 11:
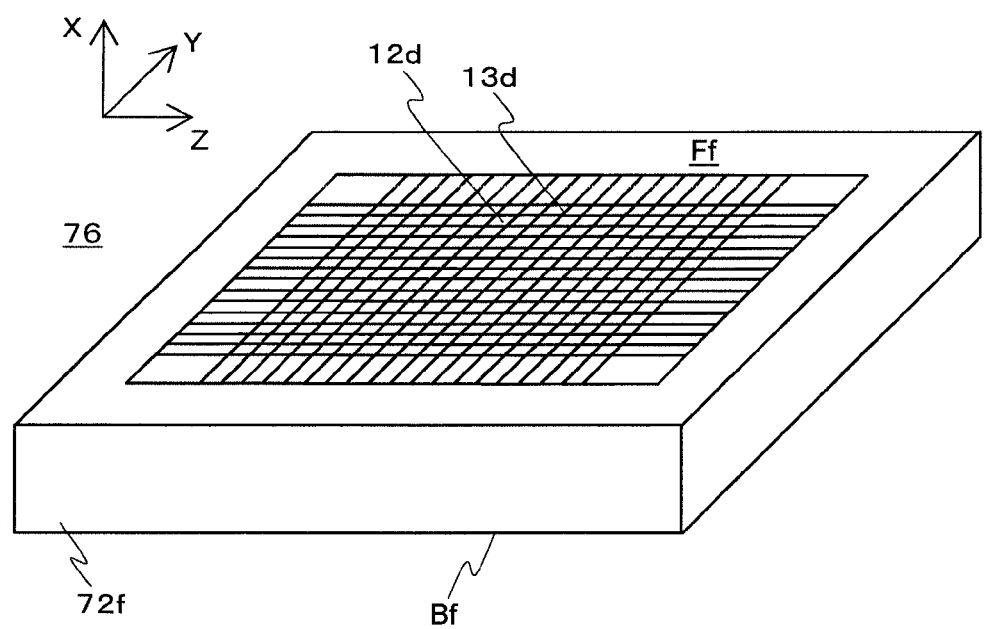
FIG. 11 is a perspective view showing a surface side of the resin-covered cell array of FIG. 10.

A rear surface Be of the resin-hardened scintillator cell body 73 is subjected to flat grinding such that a resin layer 72f has a thickness h2, thereby obtaining a resin-covered scintillator cell array 76 shown in FIG. 10 (step A15). FIG. 11 shows the resin-covered scintillator cell array 76 of FIG. 10 on the side of the front surface Ff. Pluralities of scintillator cells 12d are exposed on the front surface Ff of the resin-covered scintillator cell array 76. The reference numerals of members in the resin-covered scintillator cell array 76 corresponding to those of members constituting the resin-hardened scintillator cell body 73 have "1" in place of "e" after the same numbers.

Figure 12:
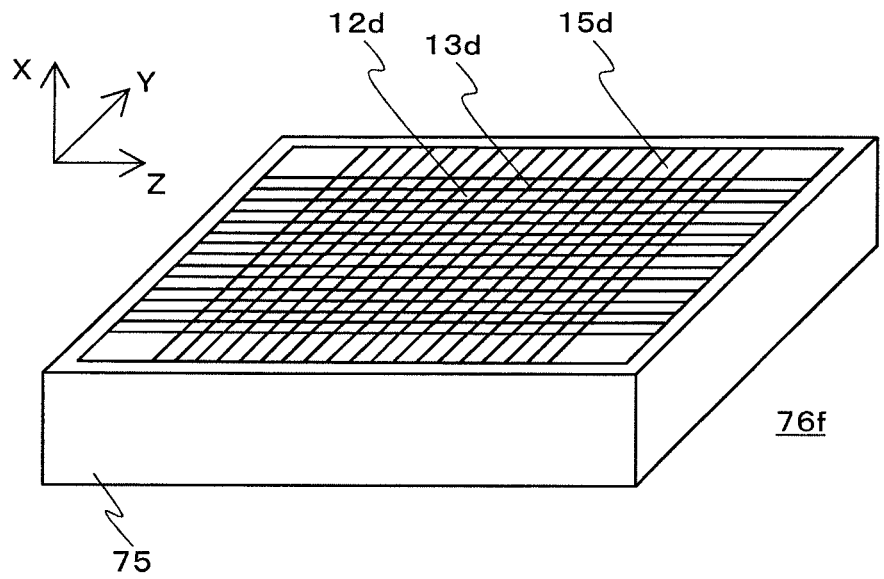
FIG. 12 is a perspective view showing one example of scintillator arrays obtained by the step A16.

A peripheral portion of the resin-covered scintillator cell array 76 is removed by a rotating grinder (not shown), to obtain a scintillator array 76f having a predetermined size as shown in FIG. 12 (step A16). The scintillator array 76f comprises reflecting resin layers 13d between scintillator cells 12d, and a reflecting resin layer 75 on a periphery and a rear surface. These reflecting resin layers 13d, 75 act as reflectors. M×N scintillator cells 12d are exposed on a front surface of the scintillator array 76f, which acts as a light-emitting surface.

Figure 13:
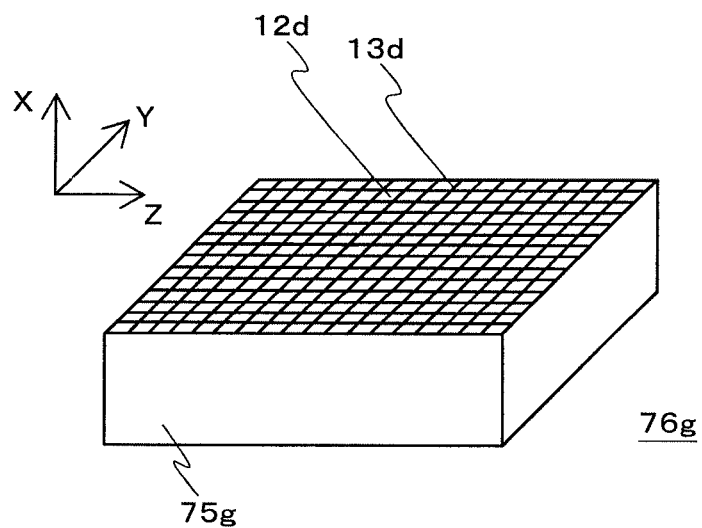
FIG. 13 is a perspective view showing another example of scintillator arrays.

After the end portions 15b are cut off in the step A3 (FIG. 3), the scintillator array can be produced by the same step as in the first embodiment, except that a reflecting resin layer 75g on the side surfaces is cut or ground to a predetermined size as shown in FIG. 13 in the periphery-cutting step A16. This method also provides a scintillator array 76g comprising pluralities of scintillator cells 12d arranged via reflecting resin layers 13d.

The first heating step for curing the liquid hardening resin and the second heating step for peeling the thermally peelable adhesive sheets can be conducted by a continuous heating apparatus. The continuous heating apparatus comprises first and second heating regions, and a belt conveyer passing through both heating regions, the liquid hardening resin being cured while articles (shown in FIGS. 4 and 8) on the belt conveyer pass through the first heating region, and the thermally peelable adhesive sheets being then foamed while passing through the second heating region. The thermally peelable adhesive sheets are easily peelable from the articles discharged from the continuous heating apparatus. This method is efficient, because the curing of the liquid hardening resin and the peeling of the thermally peelable adhesive sheets can be conducted continuously.

(4) Second Embodiment

Figure 14:
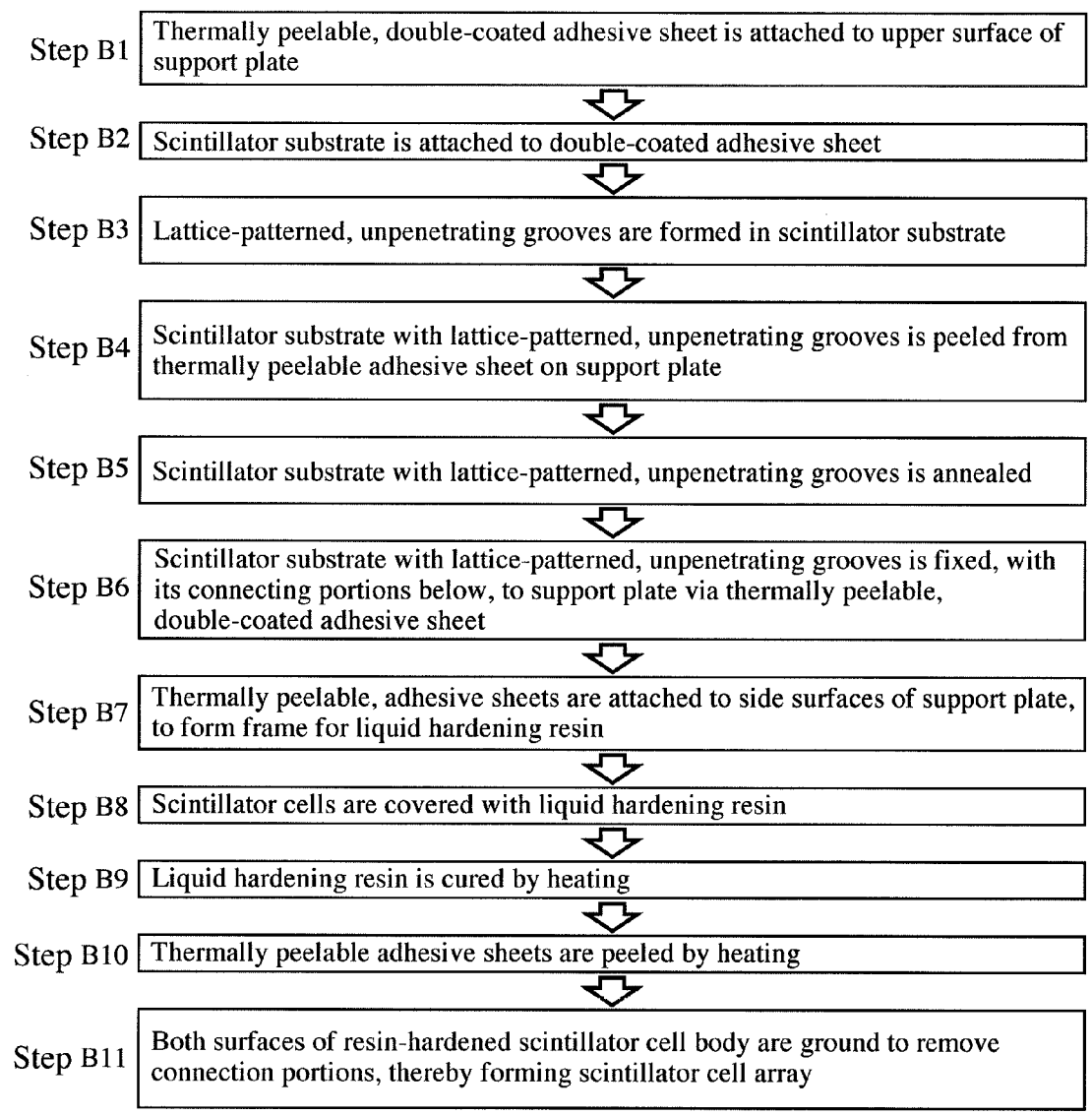
FIG. 14 is a flowchart showing a method for producing a scintillator array according to the second embodiment of the present invention.

The method in the second embodiment is characterized by forming unpenetrating grooves in place of the penetrating grooves. As shown in FIG. 14, steps B1 and B2 for fixing the scintillator substrate 10 to the support plate 30 via a thermally peelable, double-coated adhesive sheet 30a are the same as the steps A1 and A2 in the first embodiment.

Figure 15:
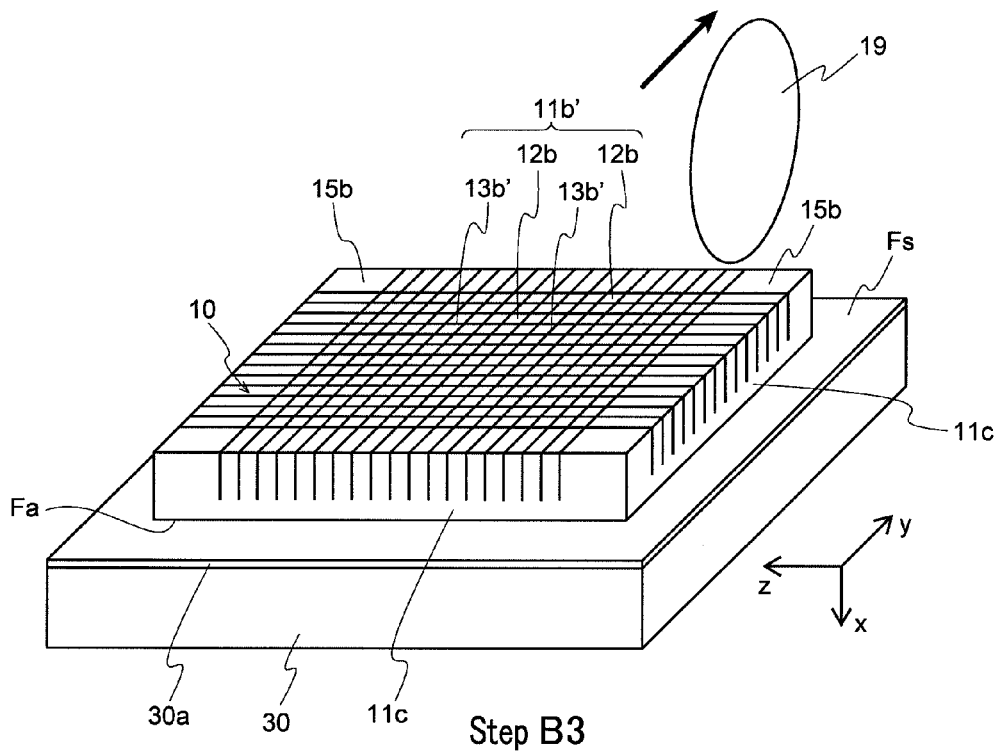
FIG. 15 is a perspective view showing the formation of lattice-patterned, unpenetrating grooves in a scintillator substrate fixed to a support plate.

As shown in FIG. 15, pluralities (M×N) of parallel, unpenetrating grooves 13b' as deep as not reaching the thermally peelable, double-coated adhesive sheet 30a are formed in a perpendicular lattice pattern in the scintillator substrate 10 excluding both end portions 15b, 15b by a rotating cutting grinder 19 (step B3). Remaining in the scintillator substrate 10 after the formation of the unpenetrating grooves 13b' are connecting portions 11c supporting scintillator cells 12b. The thickness of the connecting portions 11c is properly set, such that the scintillator cells are not cracked by the thermal curing of a liquid hardening resin in a subsequent step. End portions 15b of the scintillator substrate 11b' with lattice-patterned, unpenetrating grooves may be or may not be cut off in a subsequent step. A scintillator array 76g shown in FIG. 13 is obtained when the end portions 15b are cut off, and a scintillator array 76f shown in FIG. 12 is obtained when the end portions 15b are not cut off.

The support plate 30, to which the scintillator substrate 11b' with lattice-patterned, unpenetrating grooves is attached, is heated to the second temperature, so that the scintillator substrate 11b' with lattice-patterned, unpenetrating grooves is peeled from the support plate 30 by foaming the thermally peelable, double-coated adhesive sheet 30a (step B4). To relieve strain stored by the grooving process, the scintillator substrate 11b' with lattice-patterned, unpenetrating grooves is subjected to an annealing treatment (step B5). The annealing temperature is preferably 1000-1400° C., for example.

Figure 16:
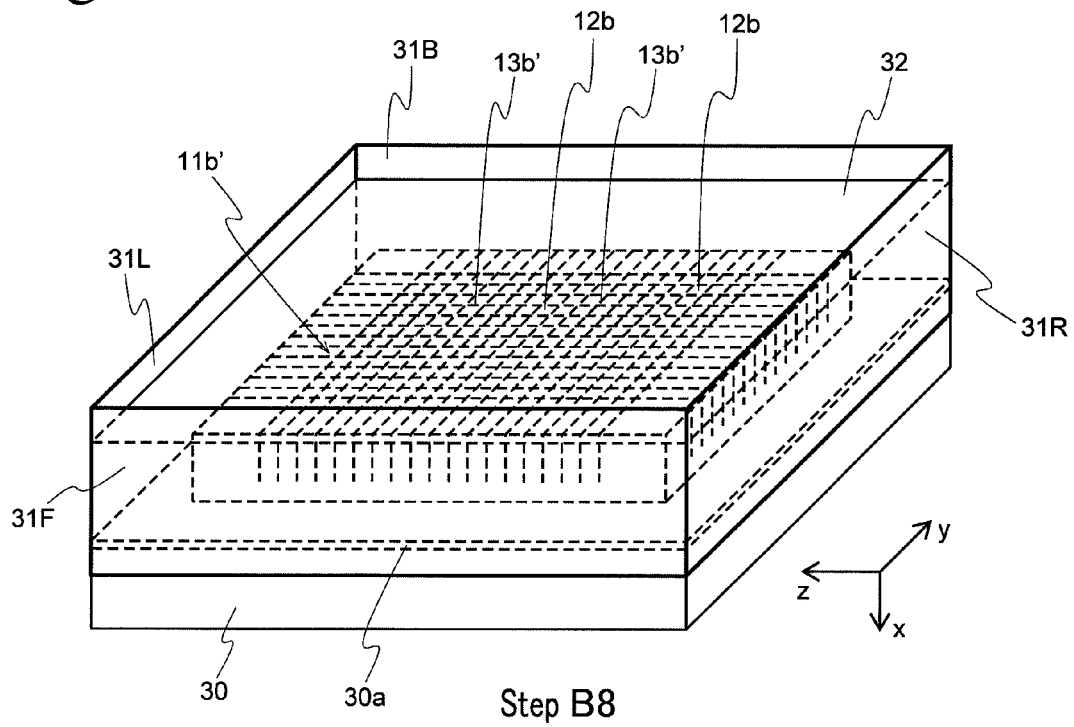
FIG. 16 is a perspective view showing a scintillator substrate with lattice-patterned, unpenetrating grooves, which is covered and hardened with a liquid hardening resin.

The annealed scintillator substrate 11b' with lattice-patterned, unpenetrating grooves is fixed to an upper surface of the support plate 30 via a thermally peelable, double-coated adhesive sheet 30a (step B6). Films 31F, 31R, 31B, 31L are attached to side surfaces of the support plate 30, to form a frame for storing a liquid hardening resin (step B7). As shown in FIG. 16, the lattice-patterned grooves are filled with a liquid hardening resin 32 introduced into a space in the frame (step B8).

The liquid hardening resin 32 is cured by heating to the first temperature, so that scintillator cells in the number of M×N are made integral by the hardened resin (step B9). The curing conditions of the liquid hardening resin 32 may be the same as in the first embodiment.

Figure 17A:
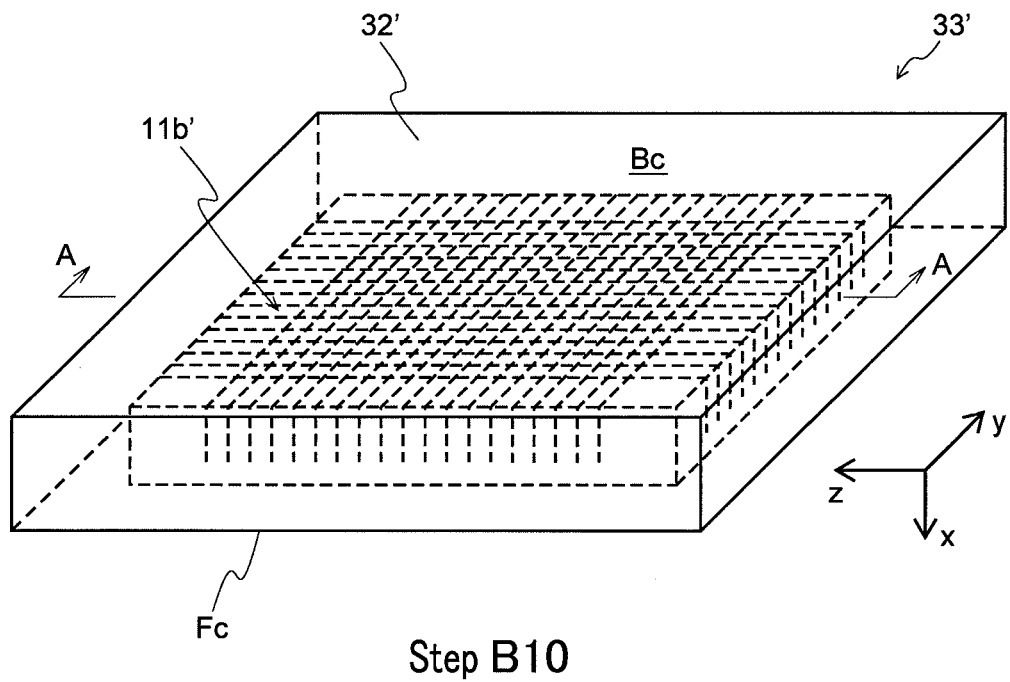
FIG. 17(a) is a perspective view showing a resin-hardened scintillator cell body comprising a scintillator substrate with lattice-patterned, unpenetrating grooves.
Figure 17B:
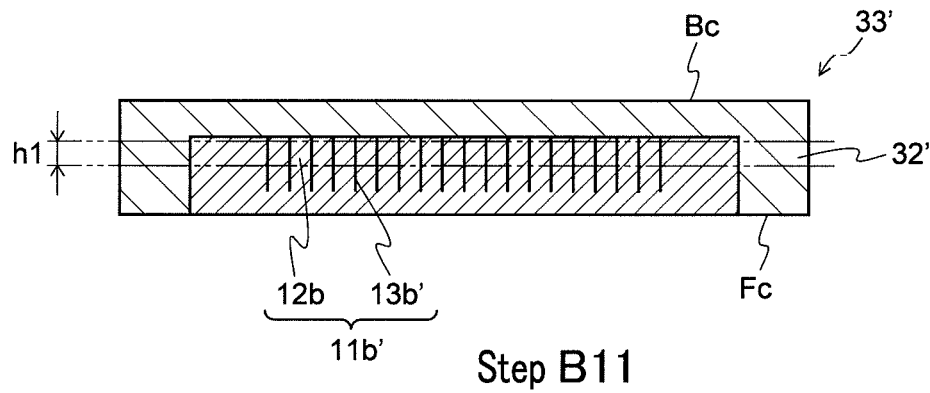
FIG. 17(b) is a cross-sectional view taken along the line A-A in FIG. 17(a).

After the liquid hardening resin 32 is cured, the thermally peelable, double-coated adhesive sheet 30a and the thermally peelable, double-coated adhesive sheets 31F, 31R, 31B, 31L are peeled by heating to the second temperature (step B10). Thus obtained is a resin-hardened scintillator cell body 33' with connecting portions shown in FIGS. 17(a) and 17(b). As shown in FIG. 17(b), to remove the connecting portions 11c, and to expose the scintillator cells on both surfaces, the front surface Fc and rear surface Bc of the resin-hardened scintillator cell body 33' are ground, thereby forming a scintillator cell array having a uniform thickness h1 (step B11). This scintillator cell array is the same as the scintillator cell array 36 shown in FIG. 7. After the step B11, a scintillator array is obtained by the same steps as the steps A9-A16 in the first embodiment.

(4) Third Embodiment

Figure 18:
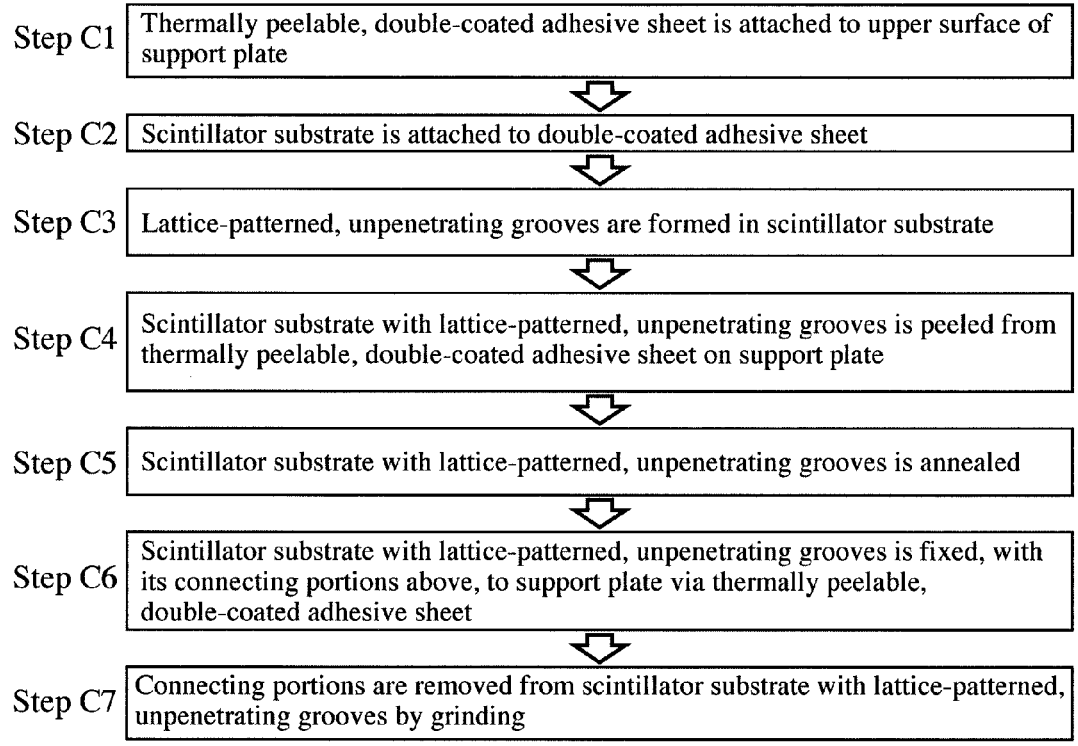
FIG. 18 is a flowchart showing a method for producing a scintillator array according to the third embodiment of the present invention.

The method in the third embodiment is different from the method in the second embodiment in the direction (vertical direction) of a scintillator substrate with lattice-patterned, unpenetrating grooves, which is fixed to a support plate via a thermally peelable, double-coated adhesive sheet. Accordingly, as shown in FIG. 18, steps C1-C4 up to the peeling of a scintillator substrate 11b' with lattice-patterned, unpenetrating grooves from a thermally peelable, double-coated adhesive sheet 30a on a support plate 30 by heating to the second temperature are the same as the steps B1-B4 in the second embodiment. Because a reflecting resin is not used to fill lattice-patterned, unpenetrating grooves directly after the scintillator substrate 10 is fixed, a thermally peelable, double-coated adhesive sheet need not be used to fix the scintillator substrate 10. Accordingly, other adhesive sheets than the thermally peelable, double-coated adhesive sheet, adhesives, etc. may be used.

Figure 19:
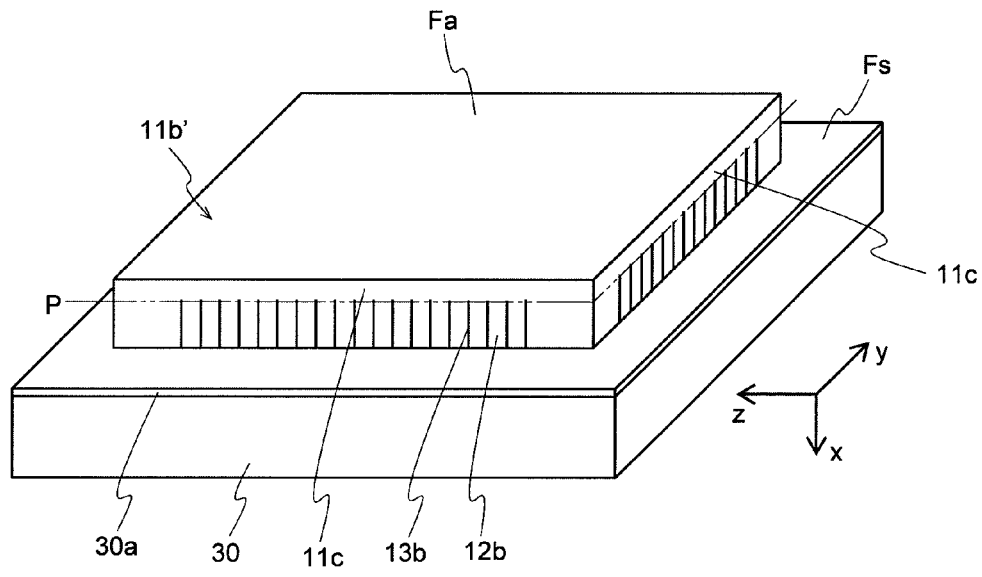
FIG. 19 is a perspective view showing a scintillator substrate with lattice-patterned, unpenetrating grooves, which is fixed, with its connecting portions above, to a support plate via a thermally peelable, double-coated adhesive sheet.
Figure 20:
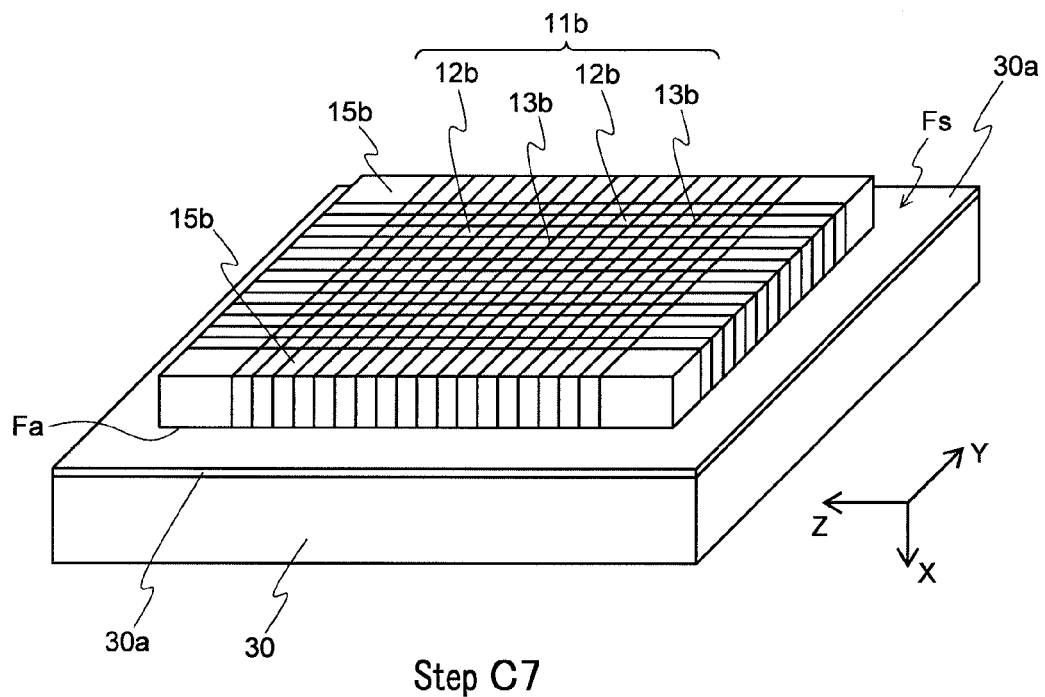
FIG. 20 is a perspective view showing a scintillator substrate with lattice-patterned, penetrating grooves, which is obtained by removing the connecting portions from the scintillator substrate with lattice-patterned, unpenetrating grooves shown in FIG. 19.

As shown in FIG. 19, with its connecting portions 11c above, the scintillator substrate 11b' with lattice-patterned, unpenetrating grooves is bonded to an upper surface Fs of a thermally peelable, double-coated adhesive sheet 30a adhered to the support plate 30 (step C6). A front surface Fa of the scintillator substrate 11b' with lattice-patterned, unpenetrating grooves is ground to depth indicated by the chain line P by a vertical grinding machine, a planar grinding machine, a lapping machine, a cutting machine, etc. As shown in FIG. 20, the connecting portions 11c are removed from the scintillator substrate 11b' with lattice-patterned, unpenetrating grooves, thereby turning the unpenetrating grooves to penetrating grooves (step C7). Thus, the same scintillator substrate 11b with penetrating grooves as shown in FIG. 3 is obtained. After the step C7, the same steps as the steps A4-A16 in the first embodiment are conducted to obtain a scintillator array.

To prevent the displacement of individual scintillator cells 12b when the connecting portions 11c are removed by grinding, each scintillator cell 12b preferably has an aspect ratio w/t of 0.2-5.

Because the liquid hardening resin 32 entering the grooves 13b shrinks when cured by heating to the first temperature, a large stress is applied to the scintillator cells 12b. However, when the scintillator cells 12b is separated before covering with the liquid hardening resin 32, individual scintillator cells 12b are subject to uniform stress due to the curing shrinkage of the liquid hardening resin 32. Accordingly, cracking can be surely prevented in the scintillator cells 12b.

Figure 21:
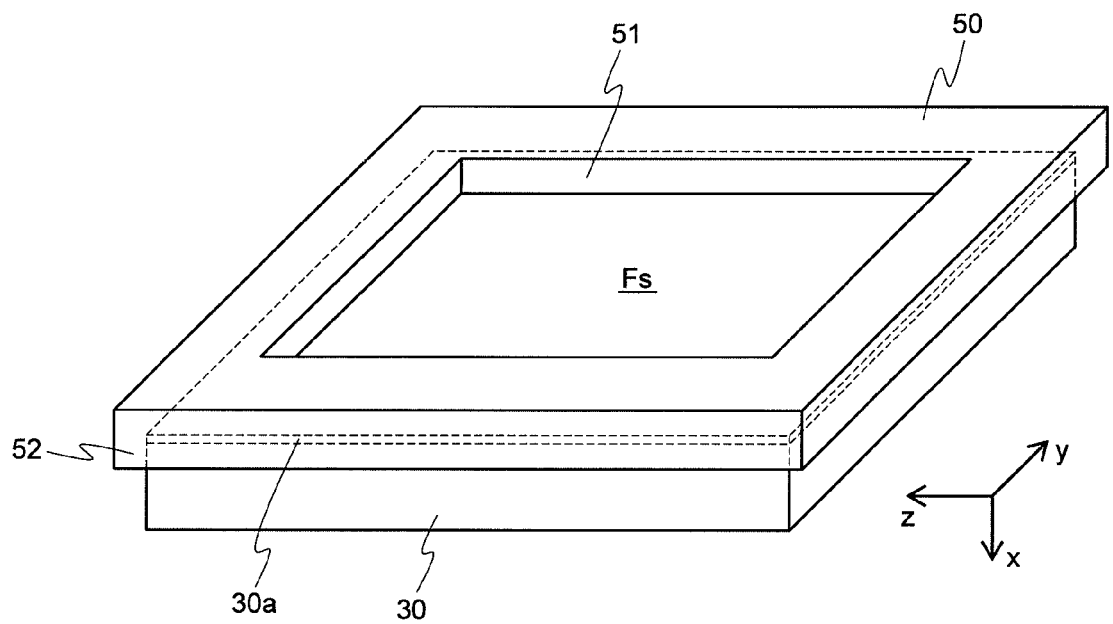
FIG. 21 is a perspective view showing a jig engaging a peripheral portion of an upper surface of a support plate with a thermally peelable, double-coated adhesive sheet, to fix a scintillator substrate with lattice-patterned, unpenetrating grooves to the support plate in a planar direction.

To surely prevent the displacement of individual scintillator cells 12b when removing the connecting portions 11c by grinding, a jig may be used. As shown in FIG. 21, for example, a jig 50 to be used comprises (a) a rectangular opening 51 having such a rectangular shape as surrounding a peripheral portion of an upper surface of the support plate 30, to which the thermally peelable, double-coated adhesive sheet 30a is attached, and such a size as holding the scintillator substrate 10, and (b) a lower flange 52 brought into contact with the side surfaces of the support plate 30. To prevent the jig 50 from being adhered to the thermally peelable, double-coated adhesive sheet 30a, it should have parting characteristics on at least surfaces in contact with the adhesive sheet 30a. To this end, for example, parting layers need only be formed on the surfaces in contact with the adhesive sheet 30a. Also, the entire jig 50 may be formed by a parting material such as Teflon (registered trademark).

Figure 22A:
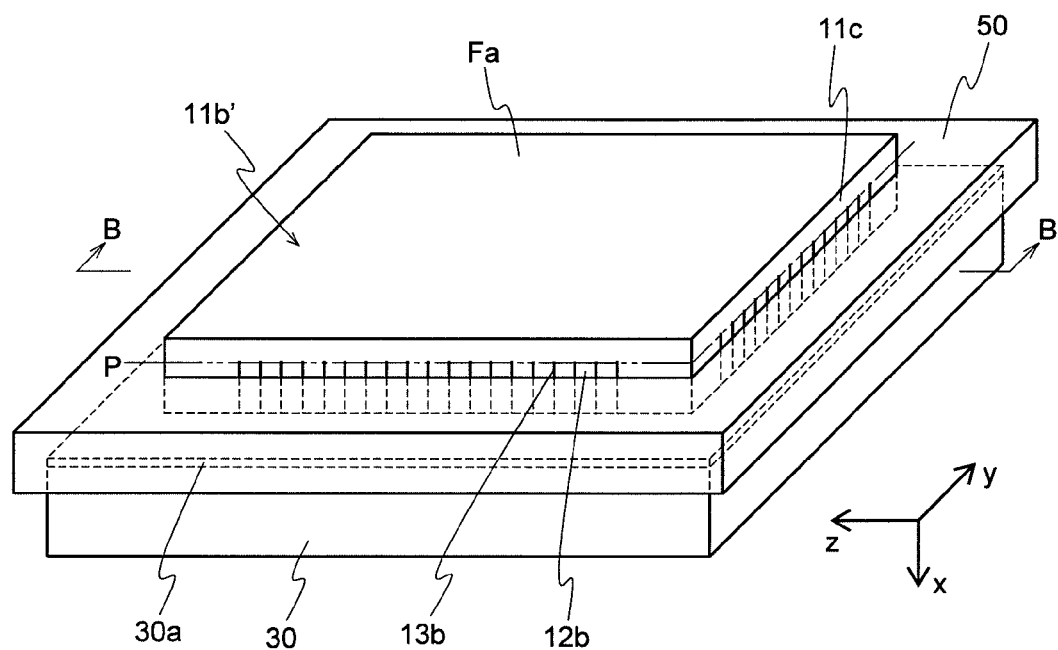
FIG. 22(a) is a perspective view showing a scintillator substrate with lattice-patterned, unpenetrating grooves, which is fixed, with its connecting portions above, to an opening of the jig.
Figure 22B:
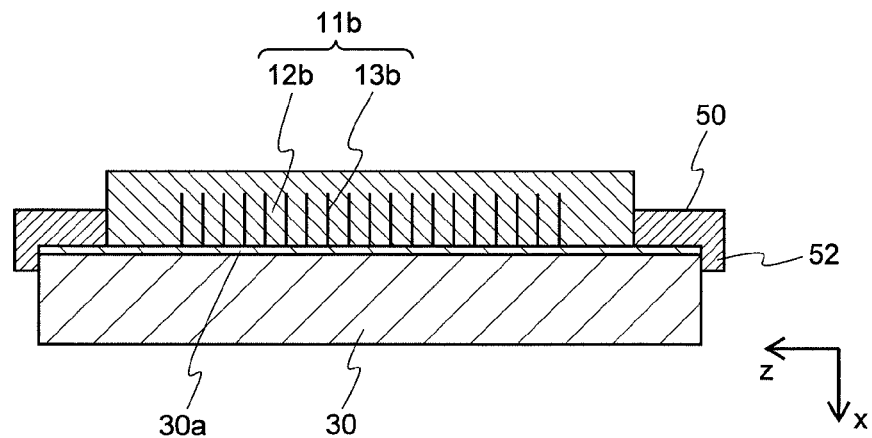
FIG. 22(b) is a cross-sectional view taken along the line B-B in FIG. 22(a).

With the jig 50 fixed to an upper surface of the support plate 30, to which the thermally peelable, double-coated adhesive sheet 30a is attached, the scintillator substrate 11b' with lattice-patterned, unpenetrating grooves is adhered, with its connecting portions 11c above, to an upper surface Fs of the thermally peelable, double-coated adhesive sheet 30a exposed in the opening 51 of the jig 50 as shown in FIG. 22(a). FIG. 22(b) shows a scintillator substrate 11b' with lattice-patterned, unpenetrating grooves, which is fixed in Y and Z directions by the jig 50. In this state, the upper surface Fa of the scintillator substrate 11b' with lattice-patterned, unpenetrating grooves is ground to remove the connecting portions 11c. Because the scintillator cells 12b are prevented from moving in Y and Z directions by the jig 50 during grinding, the scintillator cells 12b are neither displaced nor peeled from the thermally peelable, double-coated adhesive sheet 30a. After removing the connecting portions 11c, the jig 50 having parting characteristics can be easily detached from the support plate 30.

[2] Radiation Detector

Figure 23A:
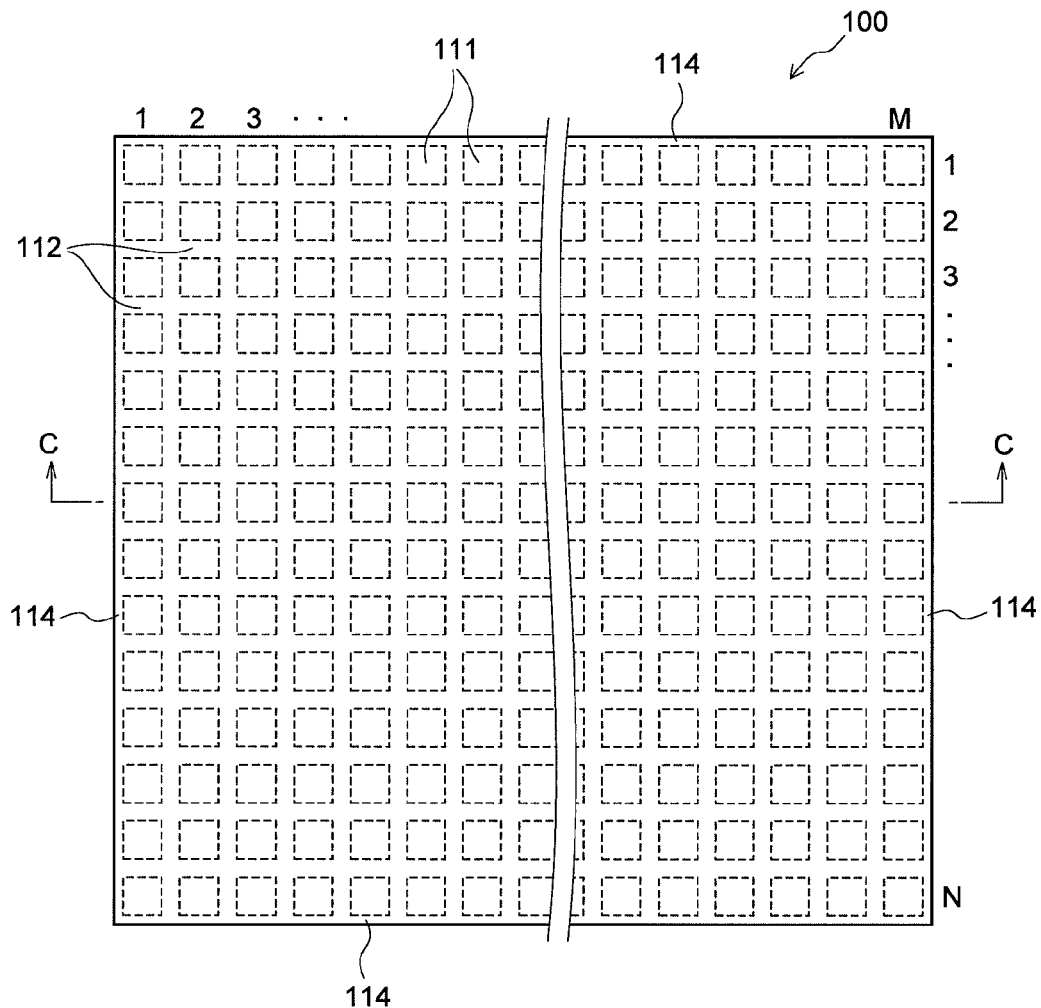
FIG. 23(a) is a plan view showing a radiation detector.
Figure 23B:
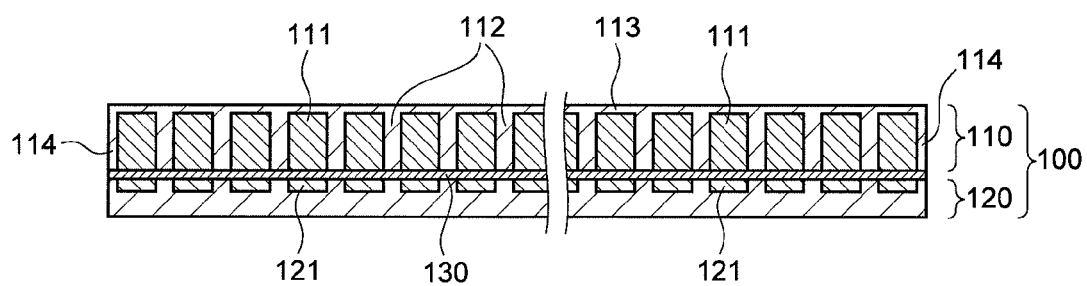
FIG. 23(b) is a cross-sectional view taken along the line C-C in FIG. 23(a).

As shown in FIGS. 23(a) and 23(b), the radiation detector 100 comprises a scintillator array 110 comprising pluralities (M×N) of scintillator cells 111 arranged in plane, a photodiode array 120 comprising pluralities of (N×M) photodiodes 121 arranged in plane such that they are aligned with the scintillator cells 111 via an optical resin layer 130, and reflecting layers 112, 113, 114 formed around the scintillator cells 111, which are formed by a reflecting resin containing white titanium oxide particles. Each scintillator cell 111 emits light rays in response to injected radiation rays, and the light rays are guided by the reflecting layers 112, 113, 114 to enter each photodiode 121, in which they are converted to electric signals. The scintillator array 110 is produced by the method of the present invention.

The present invention will be explained in further detail by Examples below, without intention of restricting the present invention thereto.

Example 1

The scintillator array shown in FIG. 13 was produced by the method in the first embodiment. First, a thermally peelable, double-coated adhesive sheet having a peeling temperature of 90° C. was adhered to an upper surface (Ra=0.1 μm, and height unevenness=50 μm) of a glass support plate, and a scintillator substrate having a composition of $Gd_2O_2S$:Ce, Pr was adhered to the adhesive sheet. Using a reflecting epoxy resin containing rutile-type titanium oxide powder, the curing temperature was 80° C., and the heating time was 3 hours. The aspect ratio w/t of each scintillator cell was 1.0. As a result, a high-precision scintillator array was efficiently produced. This scintillator array was attached to the photodiode array via an optical adhesive, to produce a radiation detector.

Example 2

A scintillator array was produced in the same manner as in Example 1 except for using a thermally peelable, double-coated adhesive sheet having a peeling temperature of 120° C. The resultant scintillator array had high precision, and the production process was efficient.

Example 3

A scintillator array was produced in the same manner as in Example 1 except for using a thermally peelable, double-coated adhesive sheet having a peeling temperature of 150° C. The resultant scintillator array had high precision, and the production process was efficient.

Comparative Example 1

A scintillator array was produced in the same manner as in Example 1 except for using a pressure-sensitive adhesive sheet without a thermally peelable function, with the second heating step omitted. Because the use of a pressure-sensitive adhesive sheet required dissolving and washing steps, Comparative Example 1 needed longer production time than in Example 1, less efficient.

Example 4

A scintillator array was produced in the same manner as in Example 2 except for changing the curing temperature of the reflecting resin to 100° C. The resultant scintillator array had high precision, and the production process was efficient.

Example 5

A scintillator array was produced in the same manner as in Example 3 except for changing the curing temperature of the reflecting resin to 100° C. The resultant scintillator array had high precision, and the production process was efficient.

Example 6

A scintillator array was produced in the same manner as in Example 1, except that a thermally peelable, double-coated adhesive strip was wound around the support plate by an auto-winding apparatus as shown in FIG. 5(a). As a result, the adhesive strip was attached to the support plate with a smaller number of steps than in Example 1.

Example 7

A scintillator array was produced in the same manner as in Example 1 except for changing the aspect ratio w/t of each scintillator cell to 0.2 (w=0.5 mm, t=2.5 mm). The resultant scintillator array had high precision, and the production process was efficient.

Example 8

A scintillator array was produced in the same manner as in Example 1 except for changing the aspect ratio w/t of each scintillator cell to 0.6 (w=0.8 mm, t=1.4 mm). The resultant scintillator array had high precision, and the production process was efficient.

Example 9

A scintillator array was produced in the same manner as in Example 1 except for changing the aspect ratio w/t of each scintillator cell to 5.0 (w=5.0 mm, t=1.0 mm). The resultant scintillator array had high precision, and the production process was efficient.

Comparative Example 2

A scintillator array was produced in the same manner as in Example 1 except for changing the aspect ratio w/t of each scintillator cell to 0.1 (w=0.1 mm, t=1.0 mm). Because the scintillator cells could not be easily held, they were worked with a low load. As a result, Comparative Example 2 needed longer time to produce the scintillator array than Example 1, less efficient.

Example 10

A scintillator array was produced in the same manner as in Example 1 except for changing the surface roughness Ra of the support plate to 2 μm. The resultant scintillator array had high precision, and the production process was efficient.

Example 11

A scintillator array was produced in the same manner as in Example 1 except for changing the surface roughness Ra of the support plate to 0.01 μm. The resultant scintillator array had high precision, and the production process was efficient.

Example 12

A scintillator array was produced in the same manner as in Example 1 except for changing the surface roughness Ra of the support plate to 10 μm. The resultant scintillator array had high precision, and the production process was efficient.

Example 13

A scintillator array was produced in the same manner as in Example 1 except for changing the height unevenness of the support plate to 100 μm. The resultant scintillator array had high precision, and the production process was efficient.

Example 14

A scintillator array was produced in the same manner as in Example 1 except for changing the height unevenness of the support plate to 0.01 mm. The resultant scintillator array had high precision, and the production process was efficient.

Example 15

A scintillator array was produced in the same manner as in Example 1 except for changing the height unevenness of the support plate to 1 μm. The resultant scintillator array had high precision, and the production process was efficient.

EFFECT OF THE INVENTION

The method of the present invention can efficiently produce scintillator arrays constituting radiation detectors used in medical CT apparatuses, baggage-inspecting CT apparatuses, etc., with high precision.

What is claimed is:

1. A method for producing a scintillator array comprising the steps of
    fixing a scintillator substrate to a support plate via a double-coated adhesive sheet, at least an adhesive surface thereof to be in contact with said scintillator substrate being thermally peelable;
    providing said scintillator substrate with lattice-patterned grooves to form a scintillator substrate having lattice-patterned grooves for defining pluralities of scintillator cells;
    filling said lattice-patterned grooves with a liquid hardening reflector resin;
    curing said liquid hardening resin by heating to form a resin-hardened scintillator cell body; and then
    peeling said double-coated adhesive sheet from said resin-hardened scintillator cell body by heating;
    wherein a scintillator substrate provided with lattice-patterned, unpenetrating grooves is peeled from said support plate, annealed, and then fixed to a support plate again via a double-coated adhesive sheet, at least an adhesive surface thereof to be in contact with said scintillator substrate being thermally peelable.

2. The method for producing a scintillator array according to claim 1, wherein said lattice-patterned grooves penetrate the scintillator substrate.

3. The method for producing a scintillator array according to claim 1, wherein lattice-patterned, unpenetrating grooves are formed such that connecting portions remain in said scintillator substrate; and wherein said connecting portions are removed after said liquid hardening resin filling said lattice-patterned grooves is cured by heating.

4. The method for producing a scintillator array according to claim 1, wherein thermally peelable adhesive surfaces of adhesive sheets are attached to the entire side surfaces of said support plate, to which said scintillator substrate having lattice-patterned, penetrating or unpenetrating grooves is fixed, such that said adhesive sheets project upward from said support plate; and said liquid hardening resin is introduced into a frame formed by the upper extensions of said adhesive sheets, to fill gaps between said scintillator cells with said liquid hardening resin.

5. The method for producing a scintillator array according to claim 4, wherein at least an adhesive surface of said adhesive sheet constituting said frame to be in contact with said liquid hardening resin is thermally peelable.

6. The method for producing a scintillator array according to claim 1, wherein a frame constituted by the adhesive sheets is attached to said double-coated adhesive sheet, such that it surrounds said scintillator substrate having lattice-patterned, penetrating or unpenetrating grooves on said support plate, to which said scintillator substrate is fixed via said double-coated adhesive sheet; and said liquid hardening resin is introduced into said frame, to fill gaps between said scintillator cells with said liquid hardening resin.

7. The method for producing a scintillator array according to claim 1, wherein both surfaces of said resin-hardened scintillator cell body are ground to form a scintillator cell array on which said scintillator cells are exposed; fixing said scintillator cell array to a support plate via a double-coated adhesive sheet, at least an adhesive surface thereof to be in contact with said scintillator cell array being thermally peelable; covering said scintillator cell array with a liquid hardening reflector resin; curing said liquid hardening resin by heating to form a resin-hardened scintillator cell array; and grinding a surface of said resin-hardened scintillator cell array to expose said scintillator cells.

8. The method for producing a scintillator array according to claim 1, wherein an aspect ratio w/t of each scintillator cell is 5 or less.

9. The method for producing a scintillator array according to claim 1, wherein said thermally peelable, double-coated adhesive sheet is foamed by heating, thereby becoming easily peelable.

10. A method for producing a scintillator array comprising the steps of
providing the scintillator substrate with lattice-patterned, unpenetrating grooves to form a scintillator substrate with lattice-patterned, unpenetrating grooves, in which pluralities of scintillator cells are integral via connecting portions;
fixing said scintillator substrate to the support plate with said lattice-patterned, unpenetrating grooves on the side of said double-coated adhesive sheet, via a double-coated adhesive sheet, at least an adhesive surface thereof to be in contact with said scintillator substrate being thermally peelable;
removing said connecting portions to form a scintillator substrate having lattice-patterned, penetrating grooves;
filling said lattice-patterned, penetrating grooves with a liquid hardening reflector resin;
curing said liquid hardening resin by heating to form a resin-hardened scintillator cell body; and then
peeling said double-coated adhesive sheet from said resin-hardened scintillator cell body by heating.

11. The method for producing a scintillator array according to claim 10, wherein said scintillator substrate is provided with lattice-patterned, unpenetrating grooves, and then annealed.

12. The method for producing a scintillator array according to claim 10, wherein a jig having as large an opening as permitting said scintillator substrate with lattice-patterned, unpenetrating grooves to be fixed to said support plate in a planar direction is attached to a peripheral portion of an upper surface of said support plate; said scintillator substrate with lattice-patterned, unpenetrating grooves is adhered to said double-coated adhesive sheet exposed in the opening of said jig: and said connecting portions are removed from said scintillator substrate with lattice-patterned, unpenetrating grooves by grinding.

13. A method for producing a scintillator array comprising the steps of
fixing a scintillator substrate to a support plate via a double-coated adhesive sheet, at least an adhesive surface thereof to be in contact with said scintillator substrate being thermally peelable;
providing said scintillator substrate with lattice-patterned grooves to form a scintillator substrate having lattice-patterned grooves for defining pluralities of scintillator cells;
filling said lattice-patterned grooves with a liquid hardening reflector resin;
curing said liquid hardening resin by heating to form a resin-hardened scintillator cell body; and then
peeling said double-coated adhesive sheet from said resin-hardened scintillator cell body by heating, wherein said support plate has surface roughness Ra of 0.01-10 µm.

14. A method for producing a scintillator array comprising the steps of
fixing a scintillator substrate to a support plate via a double-coated adhesive sheet, at least an adhesive surface thereof to be in contact with said scintillator substrate being thermally peelable;
providing said scintillator substrate with lattice-patterned grooves to form a scintillator substrate having lattice-patterned grooves for defining pluralities of scintillator cells;
filling said lattice-patterned grooves with a liquid hardening reflector resin;
curing said liquid hardening resin by heating to form a resin-hardened scintillator cell body; and then
peeling said double-coated adhesive sheet from said resin-hardened scintillator cell body by heating, wherein said support plate has height unevenness of 0.01-100 µm.

* * * * *